United States Patent
Teuchert

(10) Patent No.: US 6,473,119 B1
(45) Date of Patent: Oct. 29, 2002

(54) PHOTOGRAMMETIC CAMERA

(75) Inventor: Wolf Dieter Teuchert, Königsbronn (DE)

(73) Assignee: Carl-Zeiss-Stiftung (DE)

(*) Notice: Subject to any disclaimer, the term of this patent is extended or adjusted under 35 U.S.C. 154(b) by 0 days.

(21) Appl. No.: 09/057,376

(22) Filed: Apr. 8, 1998

(30) Foreign Application Priority Data

Apr. 8, 1997 (DE) .......................... 197 14 396

(51) Int. Cl.[7] ................................ H04N 7/18
(52) U.S. Cl. ........................ 348/144; 348/144
(58) Field of Search ...................... 348/144, 143, 348/148, 208; 250/208.1

(56) References Cited

U.S. PATENT DOCUMENTS

| | | | | |
|---|---|---|---|---|
| 4,747,574 A | * | 5/1988 | Hofmann | 356/234 |
| 4,951,136 A | * | 8/1990 | Drescher et al. | 348/148 |
| 5,264,694 A | * | 11/1993 | Diehl et al. | 250/208.1 |
| 5,555,018 A | * | 9/1996 | Von Braun | 348/147 |
| 5,721,611 A | * | 2/1998 | Kellner | 356/375 |
| 5,798,786 A | * | 8/1998 | Lareau et al. | 348/144 |
| 5,894,323 A | * | 4/1999 | Kain et al. | 348/144 |

\* cited by examiner

*Primary Examiner*—Andy Rao

(57) ABSTRACT

A photogrammetric camera for airborne or spaceborne terrain recording includes several electro-optical sensors that can be arranged at a distance from each other in the flight direction. The electro-optical sensors scan the overflown terrain and record each scanned terrain region at least twice from a respectively different perspective. At least two surface detectors are provided as the electro-optical sensors.

2 Claims, 3 Drawing Sheets

PHOTOGRAMMETIC CAMERA

BACKGROUND OF THE INVENTION

1. Field of the Invention

The invention relates to a photogrammetric camera, and more particularly, to a photogrammetric camera for airborne or spaceborne sensing of overflow terrain, and to a photogrammetric process for airborne or spaceborne sensing of overflow terrain.

2. Discussion of Relevant Art

Such cameras and recording processes are known, for example, from U.S. Pat. Nos. 4,689,748; 4,504,914 and 4,708,472, which are examples of the three-line camera, and are arranged in an aircraft or in a satellite, in order to record the overflown terrain, according to coordinates or in multiple spectra.

However, it has been found that recording terrain with such three-line cameras requires precise knowledge of the flight motions of the camera platform. In this regard, see the article, "Digital Photogrammetric Assembly (DPA)—An Airborne Stereo and Multispectral Imaging and Evaluation System" by A. Kaltenecker, F. Müller and O. Hoffman in Photogrammetric Week '95/Dieter Frisch; Dierk Hobbie (eds.), Heidelberg, Wichmann, 1995, in particular the second paragraph on page II-119. Above all, the frequently arising yaw, roll and pitch motions that are superimposed on a relatively smooth flight path of the aircraft carrying the photogrammetric camera lead to terrain lines, i.e., terrain regions in the form of lines that are scanned in succession in time, that do not adjoin and fit accurately together. To the contrary, the terrain lines are mutually rotated, and can even be interchanged in their positions in the succession.

A solution was sought in the state of the art for this problem by sensing the three spatial coordinates and three direction data of the camera at each point in time as precisely as possible by means of a combination of GPS and INS (inertial navigation). The spatial coordinates and direction data sensed at the instant of recording are associated with each terrain line, and the actual positions of the terrain lines are deduced from this data.

However, the measurement inaccuracy in spatial and directional determinations itself leads, even when the highly accurate differential GPS and inertial navigation systems are used, to an unavoidable statistical residual error of the spatial coordinates and direction data, of the order of magnitude of a third of the pixel dimensions of a CCD sensor, which in general is what is used as the electro-optical sensor. The result is that two pictures of the same area of terrain that were recorded in succession are generally not identical.

This statistical residual error presents in principle a problem for digital photogrammetry, which in fact depends on computer analysis of picture element groups within digital aerial pictures. While the photometric errors can be reduced to a practically optional degree, e.g., by slow scanning of aerial pictures on photographic film, elimination from the picture of the residual error of pictures of the three-line camera is in principle not possible.

Furthermore, in order to be able to scan the overflown terrain without gaps, the electro-optical sensors, which are built up of individual CCD lines, of the known cameras of this kind must have very short exposure times, of an order of magnitude of microseconds. The known three-line cameras therefore require good light conditions in their use. In unfavorable light conditions, such as arise, e.g., at very high flying speeds, the picture signal can sink into the noise of the electro-optical sensors.

SUMMARY OF THE INVENTION

The object of the invention is to provide a photogrammetric camera that, in contrast to the state of the art, makes possible a precise photogrammetric evaluation, and/or has smaller requirements as to the exact knowledge of, or the stability of, the flight path of the camera platform, and/or has a higher photosensitivity.

This object is achieved by a photogrammetric camera having a plurality of electro-optical sensors arranged to be spaced from each other in a flight direction that scan an overflown terrain and record scanned terrain regions at least twice from a respectively different perspective. The plurality of electro-optical sensors include at least two surface detectors.

Because the photogrammetric camera according to the invention includes at least two mutually spaced apart surface detectors, a large number of scanned line-shaped terrain regions fit accurately and unambiguously together at any given time, without rotation or interchange. Each of the successively scanned terrain lines no longer has to be correctly pre-oriented by evaluating the positional coordinates and alignment information supplied by GPS and INS, which are extraneous to the picture.

According to the invention, an orientation is possible even without the auxiliary determination of spatial coordinates and direction of the camera. On the other hand, however, picture evaluation with the use of INS and GPS, i.e. with georeferenced auxiliary information, is facilitated by the invention, since the whole picture line area of the camera provides self-consistent two-dimensional picture information. Furthermore, the accuracy requirement on the GPS/INS process can be reduced, so that, for example, an earth station for differential GPS can be dispensed with. The reason for this is based on the orientability of the partial image surfaces from the two-dimensional picture information.

The strip pictures produced with the photogrammetric camera according to the invention are always self-consistent, and thus accessible to a surface correlation and hence also to the conventional digital photogrammetric evaluation process. At least two surface detectors, according to the invention, which are arranged at a distance from each other, take the form of a single virtual surface detector, the surface of which includes, not only the surface of the surface detectors, but also the surface located between these surface detectors. The basic photogrammetric concept of the three-line camera can however also be retained by the invention and can be made considerably more powerful. Here even the middle line, which solely improves the numerical stability of the three-line camera, can be dispensed with: that is, two line-type surface detectors are sufficient according to the invention.

A further advantage over the three-line camera results from the use of three surface detectors according to the invention. Namely, the three-line camera is always evaluated from the pictures of the two outer lines, so that a nadir view is generally not possible, since the middle line is used only for support or for joining lines. The photogrammetric camera according to the invention, however, by means of the flat nature of the picture, makes possible a picture representation in a nadir view, the terrain model data being derived from the data of the two outer surface detectors.

In addition to this, a surface detector whose exposure time is greater by a factor of the number of sensor lines of the surface detector is made available for the individual sensor lines by the groupwise simultaneous exposure of numerous individual sensor lines. The photosensitivity of the photogrammetric camera according to the invention can thereby be considerably increased, and in spite of this the total exposure time of the overall picture assembled together from the individual line pictures is reduced.

In analogy to the classic three-line camera, the photogrammetric camera advantageously includes three surface detectors which are arranged at spacings from each other, so that the joining of successive pictures based on the principle of the three-line detector with line-type surface detectors, as disclosed in U.S. Pat. No. 4,689,748, for example, is possible with the photogrammetric camera according to the invention, and basically also with only two line-type surface detectors.

According to an advantageous embodiment, the surface detectors are of a rectangular or strip shape, the ratio of the dimension in the direction of flight to the dimension transverse to the direction of flight being in a range of about 1:2 to about 1:10. The optical and mechanical components of the photogrammetric camera that are associated with the surface detectors, in particular a possible deflecting mirror, can thereby be optimally dimensioned. A substantially square arrangement, i.e. a ratio of sides of about 1:1, would have the disadvantage that a deflecting mirror suited to it would have to be larger than necessary. Furthermore, with a square detector that fills the whole picture field in an appropriate manner, compensation of the picture movement caused by the motion of flight is not possible, since a picture movement compensation is equivalent to a tracking of the detector within the picture field. A further advantage of the strip-shaped surface detectors is the high readout speed that can be attained by the use of transversely readable CCD arrangements.

When the surface detectors include numerous individual, monolithic surface detectors, which are optically abutted, i.e. fitted together, transversely of the flight direction, strip-type surface detectors which are available commercially can be used, according to the invention. A particularly long length of the scanned terrain lines that run transversely of the flight direction can thereby be attained, when each surface detector from today's viewpoint, includes e.g. three monolithic individual surface detectors and three camera objectives, one for each of the individual surface detectors and having their optical axes running mutually obliquely.

Such surface detectors are preferably constructed as flat CCD arrays and preferably have respectively about 1,024 sensor lines, directly adjoining in the flight direction, with respectively about 2×1,024 to about 9×1,024 individual pixels, each about 12 μm×12 μm.

Depending on the flying speed and height, a picture movement can occur in the photogrammetric camera that considerably reduces the resolution of the camera. To compensate for the flight motion during the exposure, a mirror that can be pivoted by a motor can be associated with each of the surface detectors.

An expensive special objective can be dispensed with when a separate camera objective is associated with each of the surface detectors, and the optical axes of the camera objectives run mutually obliquely and are calibrated. In contrast to a conventional aerial mapping camera objective, the picture field is reduced to a third, with which commercially obtainable, high quality intermediate format objectives can be used, at the same focal length.

According to a further aspect of the invention, a photogrammetric process for airborne terrain sensing is proposed, in which the terrain that is overflown is scanned linewise by electro-optical sensors, and each scanned line-shaped terrain region is recorded at least twice at successive times from respectively different perspective. Then numerous directly adjacent line-shaped terrain regions that run transversely of the flight direction and are directly adjacent to each other are simultaneously recorded by the electro-optical sensors.

BRIEF DESCRIPTION OF THE DRAWINGS

The invention will now be explained hereinbelow with reference to the accompanying drawings, in which.

DETAILED DESCRIPTION OF PREFERRED EMBODIMENTS

Figure 1:
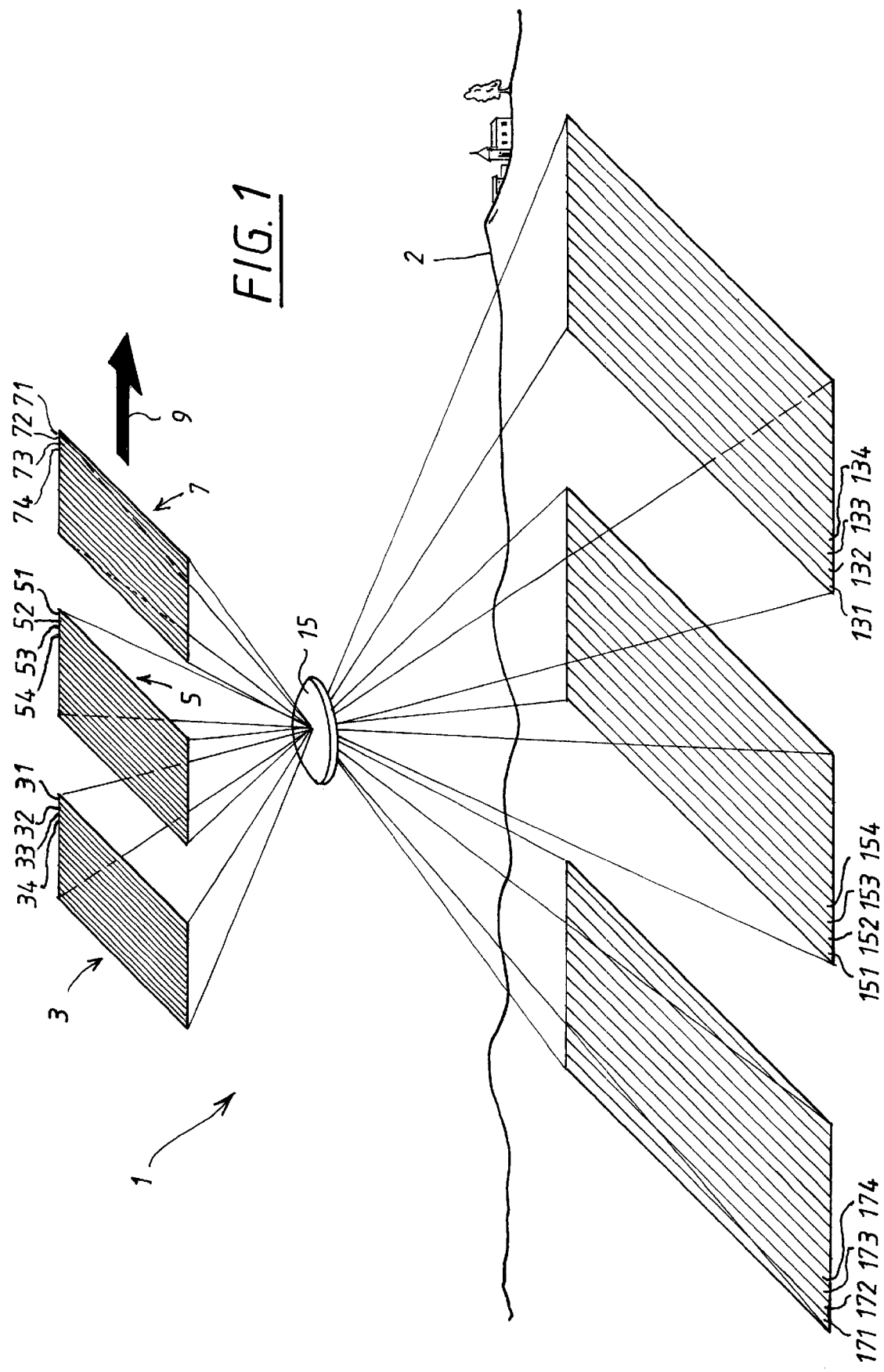
FIG. 1 shows a schematic representation of the principle of the invention.

A photogrammetric camera according to the invention is shown schematically in FIG. 1; it is arranged in an aircraft (not shown) and overflies a terrain that is symbolically represented by the wavy line 2.

The camera 1 has three surface detectors 3, 5 and 7 that are arranged at spacings from each other in the flight direction shown by the arrow 9. Here, according to the invention, only the surface detectors 3 and 7 are absolutely necessary. The surface detector 5 essentially serves for imaging directed toward the nadir.

Each of the surface detectors 3, 5 and 7 includes directly adjacent sensor lines running transversely of the flight direction 9, each with a series of individual picture elements or pixels. Thus the surface detector 3 includes the sensor lines 31, 32, 33, 34 and so on.

At the instant shown in FIG. 1, line-shaped terrain regions or terrain lines 131, 132, 133, 134 and so on are imaged on the sensor lines 31, 32, 33, 34 and so on of the surface detector 3, by means of an imaging objective 15 that, according to the invention, can consist of an array of individual objectives.

In a similar manner, the directly adjacent line-shaped terrain regions 151, 152, 153, and so on are imaged on the sensor lines 51, 52, 53 and so on of the surface detector 5, and the line-shaped terrain regions 171, 172, 173, and so on are imaged on the sensor lines 71, 72, 73 and so on of the surface detector 7.

The known photogrammetric evaluation process of the three-line camera can be carried out by means of the thereby acquired line pictures of the terrain regions together with pictures recorded later of the same terrain regions. Thus, for example, the terrain line 131 at the instant shown in FIG. 1 is scanned by the sensor line 31 of the surface detector 3, at a later instant by the sensor line 51 of the surface detector 5, and at a still later instant by the sensor line 71 of the surface detector 7.

In contrast to the three-line camera of the state of the art, in the photogrammetric camera according to the invention, with surface detectors, the scanned terrain regions 171, 172, 173 and so on are mutually parallel and directly adjoin each other, so that the evaluation of the line pictures is improved in principle.

Figure 2:
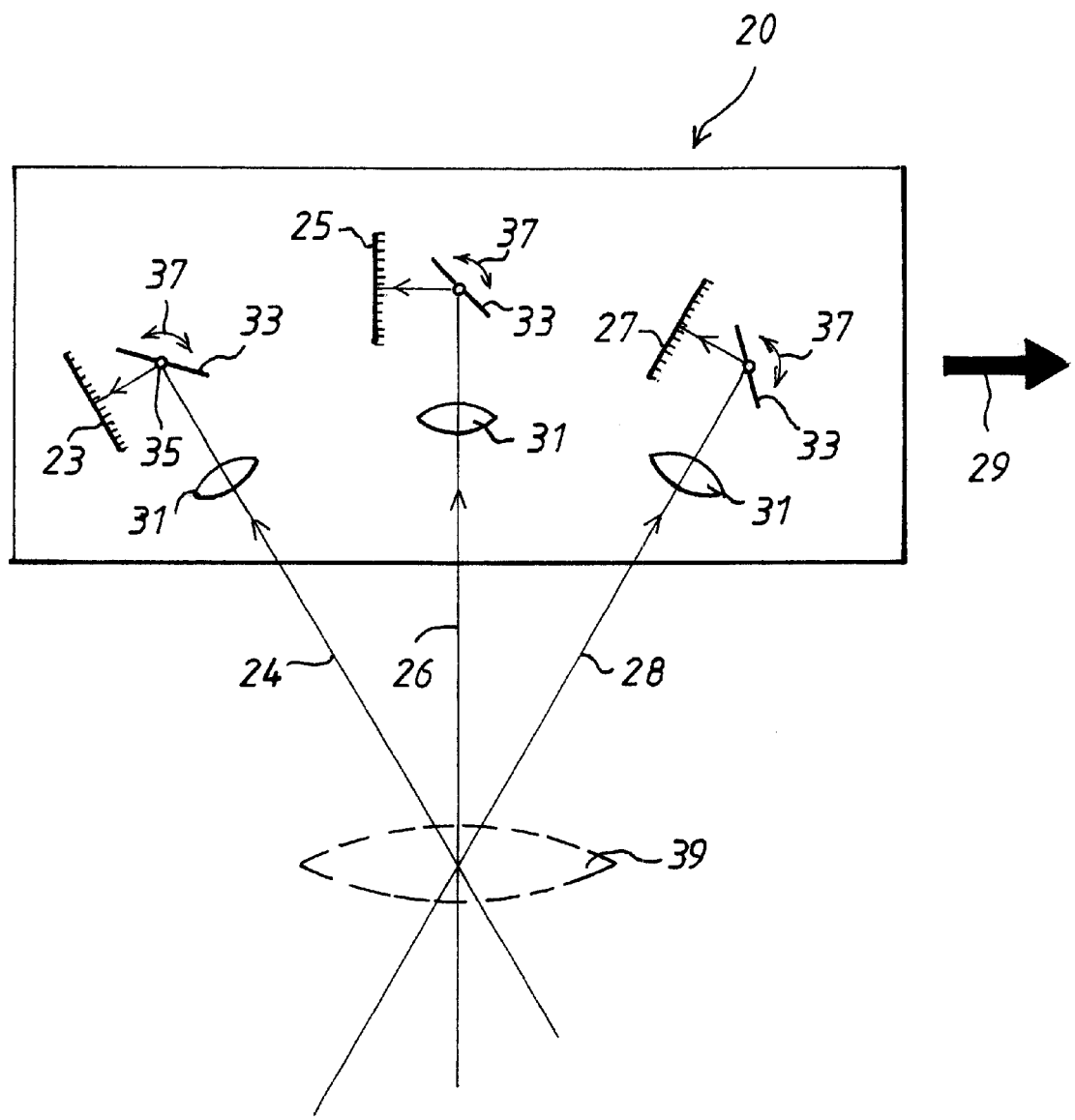
FIG. 2 shows a schematic representation of two embodiments of the invention with image movement compensation by means of pivotable deflecting mirrors.

A photogrammetric camera 20 is shown in FIG. 2 and includes three surface detectors 23, 25 and 27, seen from the side. The individual sensor lines of the surface detectors 23, 25 and 27 thus run orthogonally to the plane of the drawing in FIG. 2 and transversely to the flight direction shown by the arrow 29. Each of the surface detectors 23, 25 and 27 has associated with it an assembly with an objective 31 and a deflecting mirror 33; the optical axes denoted by 24, 26 and 28 and associated with the objectives 31 run mutually obliquely. The deflecting mirrors 33 are pivotable, as indicated by the double arrow 37, around pivot axes 35 which run orthogonally to the plane of the drawing of FIG. 2. The picture movement caused by the motion of flight can be compensated for by a pivoting of the deflecting mirrors 33 that is matched to the relationship of flying speed to aircraft height. As a further embodiment, an embodiment is represented with only one objective 39, shown dashed in FIG. 2, without the individual objectives 31.

Figure 3:
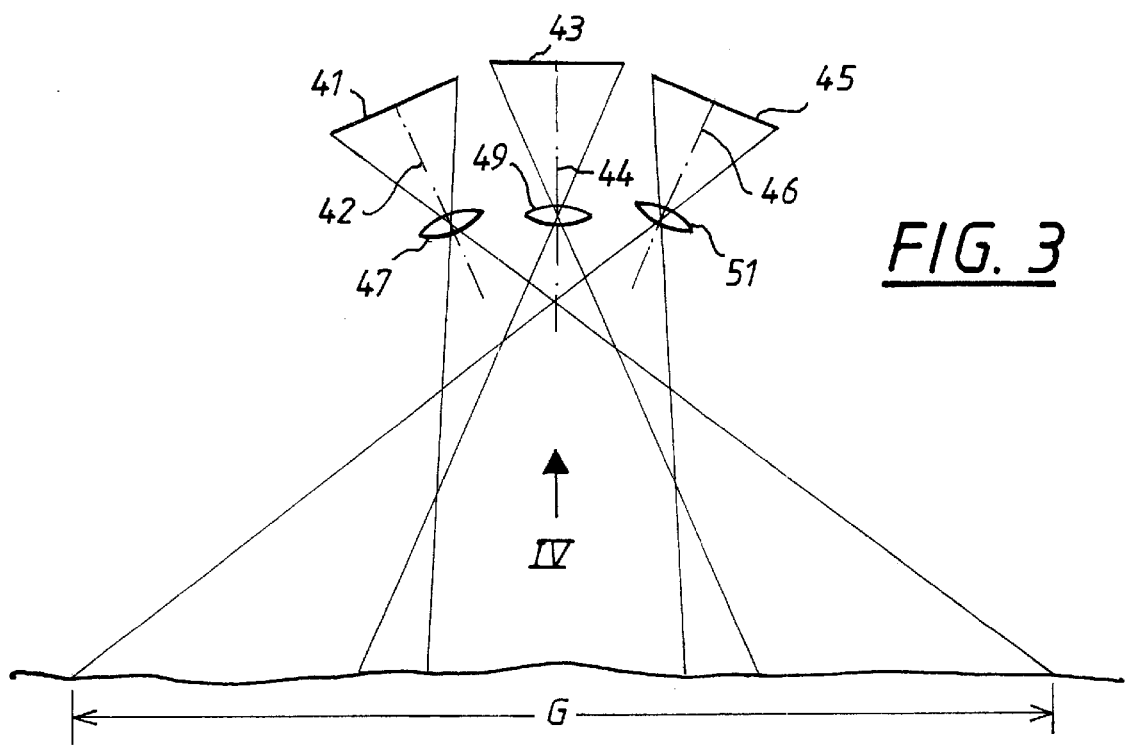
FIG. 3 shows a schematic representation of an embodiment with optically abutted sensor lines.

FIG. 3 shows how a very much longer, line-shaped terrain region G can be scanned from three individual sensor lines 41, 43 and 45 of a surface detector by optical abutting by means of the objectives 47, 49 and 51 respectively associated with each of these lines. Here the lines that have been drawn starting at the ends of the three sensor lines 41, 43 and 45 and passing through the respective objectives 47, 49 and 51, indicate the angle of view of each individual sensor line, and the dash-dot lines 42, 44 and 46 indicate the respective optical axes of the objectives 47, 49 and 51. The flight direction of the photogrammetric camera 40 runs orthogonally to the plane of the drawing of FIG. 3, so that the sensor lines arranged directly adjacent to the sensor lines 41, 43 and 45 are not to be seen in FIG. 3.

Figure 4:
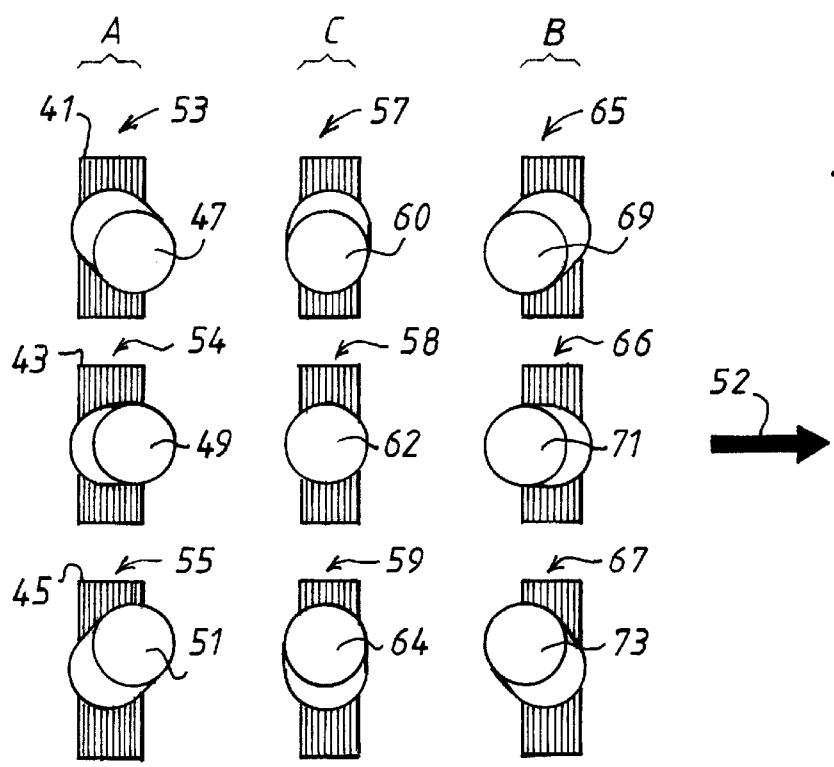
FIG. 4 shows a perspective, schematic representation of the embodiment of FIG. 3.

In FIG. 4, the embodiment of FIG. 3 is to be seen in a schematized perspective representation in the direction of the arrow IV of FIG. 3, the flight direction being indicated by the arrow 52.

It can be recognized from FIG. 4 that the lines 41, 43 and 45 belong to the line-shaped surface detectors 53, 54 and 55, which form a single surface detector A in the sense of the invention, by optical abutting by means of the objectives 47, 49 and 51 and subsequent correction of the perspective, in the photogrammetric evaluation.

The directions in which the objectives look out are represented by showing them in perspective, as stubs of circular cylinders. Thus, seen in the flight direction and from above to below, the objective 47 looks forward, to the left; the objective 60 looks downward, to the left orthogonal to the flight direction; the objective 69 looks backward, to the left; the objective 49 looks forward in the flight direction; the objective 62 looks toward the nadir; the objective 71 looks backward relative to the flight direction; the objective 51 looks forward, to the right; the objective 64 looks downward, to the right orthogonal to the flight direction; and the objective 73 looks backward, to the right.

I claim:

1. A photogrammetric camera for airborne or spaceborne terrain sensing, comprising a plurality of electro-optical sensors arranged to be spaced from each other in a flight direction that scan an overflown terrain and record scanned terrain regions at least twice from a respectively different perspective, in which:

said plurality of electro-optical sensors comprise at least two surface detectors, which detectors have planar surfaces, further comprising imaging optics that image said scanned terrain regions on said planar surfaces, and a deflecting mirror pivotable by motor, associated with each of said surface detectors for compensation of flight motion during exposure of said plurality of electro-optical sensors.

2. A photogrammetric camera for airborne or spaceborne terrain sensing, comprising a plurality of electro-optical sensors arranged to be spaced from each other in a flight direction that scan an overflown terrain and record scanned ten regions at least twice from a respectively different perspective, in which:

said plurality of electro-optical sensors comprise at least two surface detectors, which detectors have planar surfaces, her comprising imaging optics that image said scanned terrain regions on said planar surfaces, and a separate camera objective associated with each of said surface detectors, said camera objectives having optical axes that run mutually obliquely.

* * * * *